(12) United States Patent
Sutton et al.

(10) Patent No.: US 7,323,529 B2
(45) Date of Patent: Jan. 29, 2008

(54) METHOD OF MAKING COPOLYMERS CONTAINING OLEFINIC TYPE MONOMERS

(75) Inventors: Robert A. Sutton, Gibsonia, PA (US); Timothy B. Syput, New Kensington, PA (US)

(73) Assignee: PP6 Industries Ohio, Inc., Cleveland, OH (US)

( * ) Notice: Subject to any disclaimer, the term of this patent is extended or adjusted under 35 U.S.C. 154(b) by 593 days.

(21) Appl. No.: 10/723,488

(22) Filed: Nov. 26, 2003

(65) Prior Publication Data

US 2005/0113515 A1 May 26, 2005

(51) Int. Cl.
  *C08F 10/00* (2006.01)
(52) U.S. Cl. ............... 526/348.7; 526/264; 526/303.1; 526/317.1; 526/320; 526/329; 526/332
(58) Field of Classification Search ............. 526/88, 526/71, 72, 348.7, 264, 303.1, 317.1, 320, 526/329, 332
See application file for complete search history.

(56) References Cited

U.S. PATENT DOCUMENTS

| | | | |
|---|---|---|---|
| 2,378,629 A | 6/1945 | Hanford | |
| 2,411,599 A | 11/1946 | Sparks et al. | |
| 2,531,196 A | 11/1950 | Brubaker et al. | |
| 3,856,685 A | 12/1974 | Mori et al. | |
| 3,919,180 A | 11/1975 | Furukawa et al. | |
| 3,947,338 A | 3/1976 | Jerabek et al. | |
| 3,957,732 A | 5/1976 | Hirooka et al. | |

(Continued)

FOREIGN PATENT DOCUMENTS

EP    1 491 561 A1    12/2004

(Continued)

OTHER PUBLICATIONS

E. Bruce Nauman "Chemical Reactor Design, Optimization, and Scaleup ", McGraw-Hill, 2002, pp. 10-11 and 139.*

(Continued)

*Primary Examiner*—David W. Wu
*Assistant Examiner*—M. Bernshteyn
(74) *Attorney, Agent, or Firm*—William J. Uhl; Donald R. Palladino

(57) ABSTRACT

Copolymers containing residues of at least one olefinic monomer and a method of making such copolymers including the steps of:
(a) providing a pressurized stirred tank;
(b) feeding monomer compositions to one or more stirred tank reactors, where at least one monomer composition includes one or more monomers according to structure (I):

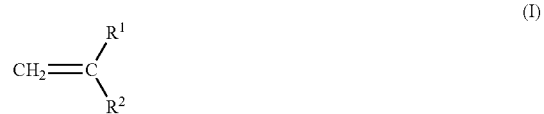

where $R^1$ is linear or branched $C_1$ to $C_4$ alkyl and $R^2$ is selected from methyl, linear, cyclic or branched $C_1$ to $C_{20}$ alkyl, alkenyl, aryl, alkaryl and aralkyl;
(c) feeding an initiator composition to the STR;
(d) maintaining in the STR hydraulically full;
(e) maintaining the monomer compositions in (b) and the initiator compositions in (c) in the STR for a residence time sufficient to effect conversion of the monomers to a copolymer composition; and
(f) discharging the copolymer composition.

40 Claims, 1 Drawing Sheet

U.S. PATENT DOCUMENTS

| | | | |
|---|---|---|---|
| 3,984,299 A | | 10/1976 | Jerabek |
| 4,045,507 A | * | 8/1977 | Cupples et al. ............. 585/511 |
| 4,045,508 A | * | 8/1977 | Cupples et al. ............. 585/511 |
| 4,139,480 A | | 2/1979 | Gardiner et al. |
| 4,147,679 A | | 4/1979 | Scriven et al. |
| 4,147,688 A | | 4/1979 | Makhlouf et al. |
| 4,151,336 A | | 4/1979 | Sackmann et al. |
| 4,220,679 A | | 9/1980 | Backhouse |
| 4,403,003 A | | 9/1983 | Backhouse |
| 4,619,979 A | * | 10/1986 | Kotnour et al. ............... 526/88 |
| 4,889,890 A | | 12/1989 | Kerr et al. |
| 4,937,288 A | | 6/1990 | Pettit, Jr. et al. |
| 4,997,900 A | | 3/1991 | Brinkman |
| 5,071,904 A | | 12/1991 | Martin et al. |
| 5,098,955 A | | 3/1992 | Pettit, Jr. |
| 5,191,145 A | * | 3/1993 | Allen et al. ................. 585/665 |
| 5,202,382 A | | 4/1993 | Pettit, Jr. |
| 5,214,101 A | | 5/1993 | Pettit, Jr. et al. |
| 5,274,153 A | * | 12/1993 | Allen et al. ................. 556/187 |
| 5,356,973 A | | 10/1994 | Taljan et al. |
| 5,407,707 A | | 4/1995 | Simeone et al. |
| 5,439,896 A | | 8/1995 | Ito et al. |
| 5,508,337 A | | 4/1996 | Wamprecht et al. |
| 5,510,444 A | | 4/1996 | Halpaap et al. |
| 5,552,487 A | | 9/1996 | Clark et al. |
| 5,554,692 A | | 9/1996 | Ross |
| 5,663,240 A | | 9/1997 | Simeone et al. |
| 5,693,870 A | * | 12/1997 | Birdwell et al. ............. 568/619 |
| 5,710,214 A | | 1/1998 | Chou et al. |
| 5,777,061 A | | 7/1998 | Yonek et al. |
| 5,807,937 A | | 9/1998 | Matyjaszewski et al. |
| 5,976,701 A | | 11/1999 | Barancyk et al. |
| 5,989,642 A | | 11/1999 | Singer et al. |
| 6,111,001 A | | 8/2000 | Barancyk et al. |
| 6,114,489 A | | 9/2000 | Vicari et al. |
| 6,281,272 B1 | | 8/2001 | Baldy et al. |
| 6,525,149 B1 | * | 2/2003 | Baxter et al. ................. 526/133 |
| 6,649,670 B1 | * | 11/2003 | Harris et al. ................. 523/175 |
| 6,677,422 B2 | * | 1/2004 | Coca et al. ................. 526/348.7 |
| 6,881,800 B2 | * | 4/2005 | Friedersdorf ................. 526/68 |
| 6,906,164 B2 | * | 6/2005 | DeBruin ................. 528/308.1 |
| 2003/0171515 A1 | | 9/2003 | Coca et al. ............. 526/219.6 |

FOREIGN PATENT DOCUMENTS

| | | |
|---|---|---|
| WO | 03/070782 A1 | 8/2003 |
| WO | 03/070783 A1 | 8/2003 |

OTHER PUBLICATIONS

Greenley, "Q and e Values for Free Radical Copolymerizations of Vinyl Monomers and Telogens," *Polymer Handbook,* Fourth Edition, John Wiley & Sons, Inc., pp. 309-319, 1999.

Odian, "Chain Copolymerization," *Principles of Polymerization,* Third Edition, John Wiley & Sons, Inc., pp. 452-491, 1991.

Cowie, *Alternating Copolymers,* Plenum Press, pp. 1-137, 1985.

Rzaev et al., "Complex-Radical Copolymerization of 2,4,4-trimethylpentene-1 with Maleic Anhydride," *Eur. Polym. J.,* vol. 34, No. 7, pp. 981-985, 1998.

Mashita et al., "Alternating Copolymerization of Isobutylene and Acrylic Ester with Alkylboron Halide," *Polymer,* vol. 36, No. 15, pp. 2973-2982, 1995.

Mashita et al., "Alternating Copolymers of Isobutylene and Acrylic Ester by Complexed Copolymerization," *Polymer,* vol. 36, No. 15, pp. 2983-2988, 1995.

Kuntz et al., "Poly[2,2-Dimethyl-4-(methoxylcarbonyl)butylene]: Synthesis with an Ethylaluminum Sesquichloride-Peroxide Initiator and NMR Characterization," *J. of Polymer Science: Polymer Chemistry Edition,* vol. 16, pp. 1747-1753, 1978.

Hirooka et al., "Complexed Copolymerization of Vinyl Compounds with Alkylaluminum Halides," *Journal of Polymer Science: Polymer Chemistry Edition,* vol. 11, pp. 1281-1306, 1973.

* cited by examiner

FIG. 1

METHOD OF MAKING COPOLYMERS CONTAINING OLEFINIC TYPE MONOMERS

FIELD OF THE INVENTION

The present invention generally relates to a method of making copolymers of olefinic monomers. More specifically, the present invention is directed to a method of making copolymers containing isobutylene-type monomers.

BACKGROUND OF THE INVENTION

It is often observed that monomers that do not readily homopolymerize are able to undergo copolymerization reactions with appropriate co-monomers. The most typical situation occurs when a strong electron donating monomer is mixed with a strong electron accepting monomer from which a regular alternating copolymer results after free radical initiation. Maleic anhydride is a widely used example of a strong electron accepting monomer. Styrene and vinyl ethers are typical examples of electron donating monomers. Systems, such as maleic anhydride—styrene, are known to form charge transfer complexes, which tends to place the monomers in alternating sequence prior to initiation. The application of the free radical initiator "ties" the ordered monomers together to form an alternating copolymer (Cowie, *Alternating Copolymers*, Plenum, New York (1985)).

U.S. Pat. Nos. 2,378,629 to Hanford and U.S. Pat. No. 4,151,336 to Sackmann et al. disclose that even when a moderately electron donating monomer, such as diisobutylene, is copolymerized with a strong electron acceptor monomer, such as maleic anhydride, an alternating copolymer results.

When a moderately electron donating monomer, such as isobutylene, is copolymerized with a moderately electron accepting monomer, such as an acrylic ester, poor incorporation of the electron donating monomer results. For example, free radical copolymerization of isobutylene (IB) and acrylic monomers has resulted in copolymers that contain at most 20-30% of IB and have low molecular weights because of degradative chain transfer of IB. Examples of such copolymerizations of IB are disclosed in U.S. Pat. No. 2,411,599 to Sparks et al. and U.S. Pat. No. 2,531,196 to Brubaker et al.

The ability to make copolymers of acrylic monomers and IB type monomers is desired in the art. For example, many patents express the potential for using IB-containing polymers in coating compositions. U.S. Pat. No. 6,114,489 to Vicari et al. discloses a coating composition that includes a functional acrylic resin binder; a co-reactant capable of reacting with the functionality of the acrylic binder; a degasser; and a hyperbranched polyester flow and leveling agent. IB is suggested as a potential co-monomer for use in the acrylic binder as part of a long list of monomers. U.S. Pat. No. 5,552,487 to Clark et al. discloses powder coating compositions that include a copolymer having a reactive functionality and a suitable crosslinking agent capable of reaction with the reactive functionality of the copolymer. The copolymer is made by copolymerizing functional monomers with other monomers, isobutylene being one among many listed as potential co-monomers. Although only two are referenced herein, of the many patents that express the possibility of using isobutylene-type co-monomers, none actually shows or discloses a working example of such a copolymer.

The fact that few examples of isobutylene-type monomer-containing copolymers are found is due to the generally non-reactive nature of isobutylene with acrylic and methacrylic monomers. Reactivity ratios for monomers can be calculated using the Alfrey—Price Q-e values (Robert Z. Greenley, *Polymer Handbook*, 4$^{th}$ Ed., Brandrup, Immergut and Gulke, editors, Wiley & Sons, New York, N.Y., pp. 309-319 (1999)). The calculations may be carried out using Formulas I and II:

$$r_1 = (Q_1/Q_2)\exp\{-e_1(e_1-e_2)\} \qquad \text{I}$$

$$r_2 = (Q_2/Q_1)\exp\{-e_2(e_2-e_1)\} \qquad \text{II}$$

where $r_1$ and $r_2$ are the respective reactivity ratios of monomers 1 and 2, and $Q_1$ and $Q_2$ and $e_1$ and $e_2$ are the respective reactivity and polarity values for the respective monomers (Odian, *Principals of Polymerization*, 3$^{rd}$ Ed., Wiley-Interscience, New York, N.Y., Chapter 6, pp. 452-467 and 489-491 (1991)). Table 1 shows the calculated reactivity ratios of selected monomers with isobutylene:

TABLE 1

| Monomer | $r_1$ (isobutylene) | $r_2$ |
|---|---|---|
| Methyl acrylate | 0.10 | 13.67 |
| Glycidyl methacrylate | 0.08 | 34.17 |
| Methacrylic acid | 0.09 | 39.71 |

As one skilled in the art of polymer chemistry can appreciate, when $r_1$ is near zero and $r_2$ has a value of 10 or more, monomer 2 is reactive toward both monomers and monomer 1 is reactive toward neither monomer. In other words, it is extremely difficult to prepare copolymers having significant amounts of both monomers. It is not surprising then that few examples can be found of coating compositions that include isobutylene-type monomer-containing copolymers, because the monomers do not tend to copolymerize.

A few examples of acrylic ester or acrylonitrile copolymers made by copolymerizing with monomers such as propylene, isobutylene, and styrene have been accomplished in the presence of Lewis acids, such as alkylaluminum halides, to give 1:1 alternating copolymers. The alternating copolymers were obtained when the concentration ratio of the Lewis acids to the acrylic esters was 0.9 and the concentration of IB was greater than the concentration of the acrylic esters (Hirooka et al., *J. Polym. Sci. Polym. Chem.*, 11, 1281 (1973)). The metal halides vary the reactivity of the monomers by complexing with them. The electron donor monomer-electron acceptor monomer-metal halide complex leads to alternating copolymers (Mashita et al., *Polymer*, Vol. 36, No. 15, pp. 2973-2982, (1995)).

Copolymers of IB and methyl acrylate (MA) have also been obtained by using ethyl aluminum sesquichloride and 2-methyl pentanoyl peroxide as an initiating system. The resulting copolymer had an alternating structure, with either low (Kuntz et al., *J. Polym. Sci. Polym. Chem.*, 16, 1747 (1978)) or high isotacticity in the presence of EtAlCl$_2$ (10 molar % relative to MA). (Florjanczyk et al., *Makromol. Chem.*, 183, 1081 (1982)).

Another method for making IB copolymers with acrylic esters involved alkyl boron halide, which was found to be much more active than alkyl aluminum halides in forming alternating copolymers. The resulting copolymer was an elastomer of high tensile strength and high thermal decomposition temperature with good oil resistance, especially at elevated temperatures (Mashita et al., *Polymer*, 36, 2983 (1995)).

U.S. Pat. No. 5,807,937 to Matyjaszewski et al. discloses a method of making alternating copolymers of isobutylene and methyl acrylate using atom transfer radical polymerization (ATRP) processes. The method requires the use of a suitable ATRP initiator, such as 1-phenylethyl bromide, and suitable transition metal salts, such as CuBr, with a ligand, such as 2,2'-bipyridyl, to perform the complex redox initiation and propagation steps of the polymerization process.

Copolymers containing relatively high amounts (≧30 mole %) of IB and acrylic esters have only been attained by free radical polymerization when Lewis acids or ATRP initiation systems have been employed. The polymer that results from such processes requires expensive and time consuming clean-up to remove the transition metal salt and/or Lewis acid residues in order to make the polymer commercially useful.

Copolymer compositions that contain Lewis acids and/or transition metals intermingled with the copolymer can have a number of drawbacks when used commercially. Some Lewis acids and transition metals are toxic and have adverse environmental effects if they are leached from the copolymer and enter the environment. In coating applications, the Lewis acids and transition metals may lead to poor stability when exposed to UV light or simply cause the coating to discolor. In other applications, the Lewis acids and transition metals may react with other ingredients in a formulation resulting in undesired properties.

One method of overcoming the problems described above is disclosed in co-pending U.S. patent application Ser. No. 10/077,559, which is directed to a method of making a copolymer containing isobutylene-type co-monomers. The method includes the steps of (a) providing a monomer composition that includes an isobutylene-type monomer; (b) mixing the monomer composition in (a) with an ethylenically unsaturated monomer composition that includes one or more acrylic monomers, and (c) polymerizing the mixture resulting from step (b) in the presence of a free radical polymerization initiator. The polymerization is carried out in the substantial absence of Lewis acids and/or transition metals. The isobutylene-type monomer is present at a molar excess of at least 10 mole % based on the molar concentration of acrylic monomers.

However, the significant excess of isobutylene monomers utilized in the above-described process, results in significant levels of unreacted monomers being present with the copolymer, which must be removed therefrom prior to using the copolymer commercially. Removal of the unreacted monomer can be time consuming and expensive. Furthermore, even when the unreacted monomers can be removed from the copolymer, the ability to recycle the monomers is limited as initiator by-products and residues often contaminate the recovered monomers. The latter situation results in waste generation if the monomers are subsequently discarded and added expense if additional separation techniques are used to isolate pure monomers that can be recycled into the polymerization process.

Therefore, there is a clear and present need for a method for making copolymers containing olefinic monomers, and in particular, isobutylene-type monomers, that does not rely on Lewis acids and transition metals to obtain an alternating copolymer and which minimizes or eliminates unreacted monomer contamination in the final copolymer.

SUMMARY OF THE INVENTION

The present invention is directed to a method of making a copolymer composition containing residues of at least one olefinic monomer comprising the steps of:

(a) providing at least one pressurized stirred tank reactor (STR) having at least one inlet and at least one outlet;

(b) feeding one or more monomer compositions to an STR by way of at least one of the inlets, wherein at least one monomer composition comprises one or more monomers having the following structure (I):

where $R^1$ is linear or branched $C_1$ to $C_4$ alkyl and $R^2$ is selected from methyl, linear, cyclic or branched $C_1$ to $C_{20}$ alkyl, alkenyl, aryl, alkaryl and aralkyl, any of which can optionally include one or more functional groups;

(c) feeding one or more initiator compositions to the STR by way of one or more of the inlets, (d) maintaining the liquid level in the STR such that there is substantially no air or vapor space in the STR;

(e) maintaining the monomer compositions in (b) and the initiator compositions in (c) in the STR for a residence time sufficient to effect conversion of the monomers to a copolymer composition; and (f) discharging the copolymer composition by way of the outlet.

The present invention is also directed to copolymers obtained from the above-described method.

DETAILED DESCRIPTION OF THE INVENTION

Other than in the operating examples or where otherwise indicated, all numbers or expressions referring to quantities of ingredients, reaction conditions, etc. used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

As used herein, the term "copolymer composition" is meant to include a synthesized copolymer as well as residues from initiators, catalysts, and other elements attendant to the synthesis of the copolymer, but not covalently incorporated thereto. Such residues and other elements considered as part of the copolymer composition are typically mixed or co-mingled with the copolymer such that they tend to remain with the copolymer when it is transferred between vessels or between solvent or dispersion media.

As used herein, the term "substantially free" is meant to indicate that a material is present as an incidental impurity. In other words, the material is not intentionally added to an indicated composition, but may be present at minor or inconsequential levels because it was carded over as an impurity as part of an intended composition component.

The terms "donor monomer" and "acceptor monomer" are used throughout this application. With regard to the present invention, the term "donor monomer" refers to monomers that have a polymerizable ethylenically unsaturated group that has relatively high electron density in the ethylenic double bond, and the term acceptor monomer refers to monomers that have a polymerizable ethylenically unsaturated group that has relatively low electron density in the ethylenic double bond. This concept has been quantified to an extent by the Alfrey-Price Q-e scheme (Greenley, *Polymer Handbook*, 4$^{th}$ Ed., Brandrup, Immergut and Gulke, Wiley & Sons, New York, N.Y., pp. 309-319 (1999)). All e values recited herein are those appearing in the *Polymer Handbook* unless otherwise indicated.

In the Q-e scheme, Q reflects the reactivity of a monomer and e represents the polarity of a monomer, which indicates the electron density of a given monomer's polymerizable, ethylenically unsaturated group. A positive value for e indicates that a monomer has a relatively low electron density and is an acceptor monomer. A low or negative value for e indicates that a monomer has a relatively high electron density and is a donor monomer. As referred to herein, an "acceptor monomer" is meant to include those monomers with an e value greater than 0.5. Conversely, the term "donor monomer" is meant to include those monomers with an e value of less than 0.5.

As used herein, the term "solvent" refers to conventional aprotic, aliphatic, and/or aromatic solvents or diluents known in the art. Non-limiting examples of solvents include acetone, methyl ethyl ketone, methyl isobutyl ketone, dimethyl sulfoxide (DMSO), ethers, and $C_4$ to $C_{20}$ linear, branched and cyclic, aliphatic and aromatic compounds.

The present invention provides a method of making a copolymer composition containing residues of at least one olefinic monomer comprising the steps of:

(a) providing at least one pressurized stirred tank reactor (STR) having at least one inlet and at least one outlet;

(b) feeding one or more monomer compositions to an STR by way of at least one of the inlets, wherein at least one monomer composition comprises one or more monomers having the following structure (I):

(I)

where $R^1$ is linear or branched $C_1$ to $C_4$ alkyl and $R^2$ is selected from methyl, linear, cyclic or branched $C_1$ to $C_{20}$ alkyl, alkenyl, aryl, alkaryl and aralkyl, any of which can optionally include one or more functional groups;

(c) feeding one or more initiator compositions to the STR by way of one or more of the inlets;

(d) maintaining the liquid level in the STR such that there is substantially no air or vapor space in the STR;

(e) maintaining the monomer compositions in (b) and the initiator compositions in (c) in the STR for a residence time sufficient to effect conversion of the monomers to a copolymer composition; and (f) discharging the copolymer composition by way of the outlet.

In an embodiment of the present invention, the monomer of structure (I) is selected from isobutylene, diisobutylene, dipentene, isoprenol (isobutylene-type monomers) and mixtures thereof.

In another embodiment of the present invention, the group $R^2$ of the monomer of structure (I) includes one or more functional groups selected from the group consisting of epoxy, carboxylic acid, hydroxy, amide, oxazoline, acetoacetate, isocyanate, carbamate, amine, amine salt, quaternized amine, thiol, methylol, methylol ether, and sulfonium salt.

In a further embodiment of the present invention, at least one monomer composition in (b) includes one or more monomers selected from acrylonitrile and acrylic monomers described by structure (III):

(III)

wherein Y is selected from $-NR^3{}_2$, $-O-R^5-O-C(=O)-NR^3{}_2$ and $-OR^4$; $R^3$ is selected from H, linear or branched $C_1$ to $C_{20}$ alkyl and linear or branched $C_1$ to $C_{20}$ alkylol; $R^4$ is selected from H, poly(ethylene oxide), poly(propylene oxide), linear or branched $C_1$ to $C_{20}$ alkyl, alkylol, aryl, alkaryl and aralkyl, linear or branched $C_1$ to $C_{20}$ fluoroalkyl, fluoroaryl and fluoroaralkyl, a siloxane, a polysiloxane, an alkyl siloxane, an ethoxylated trimethylsilyl siloxane and a propoxylated trimethylsilyl siloxane; and $R^5$ is a divalent linear or branched $C_1$ to $C_{20}$ alkyl linking group. Optionally, $R^3$ and/or $R^4$ can include one or more functional groups.

In an additional embodiment of the present invention, the group Y in structure III includes at least one functional group of one or more selected from epoxy, carboxylic acid, hydroxy, amide, oxazoline, acetoacetate, isocyanate, carbamate, amine, amine salt, quaternized amine, thiol, methylol, methylol ether, and sulfonium salt. In another embodiment of the present invention, at least one monomer composition in (b) includes one or more monomers selected from styrene, substituted styrenes, methyl styrene, substituted methyl styrenes, vinyl ethers and vinyl pyridine.

In a particular embodiment of the invention, any of the monomer compositions can include one or more of the monomers selected from hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide, chlorotrifluoroethylene, glycidyl acrylate, 2-ethylhexyl acrylate and n-butoxy methyl acrylamide.

In an alternative embodiment of the invention, the copolymer composition resulting from the present method is reacted such that one or more functional groups are incorporated into the copolymer. Any suitable functional group can be incorporated into the copolymer. Suitable functional groups that can be incorporated into the copolymer include, but are not limited to, epoxy, carboxylic acid, hydroxy, amide, oxazoline, acetoacetate, isocyanate, carbamate, amine, amine salt, quaternized amine, thiol, methylol, methylol ether, and sulfonium salt.

In an embodiment of the invention, the initiator composition includes a thermal free radical initiator and optionally one or more solvents. Any suitable thermal free radical initiator can be used in the present method. Suitable thermal free radical initiators include, but are not limited to, peroxide compounds, azo compounds, persulfate compounds, and mixtures thereof.

Any suitable peroxide compound that can initiate polymerization can be used in the invention. As non-limiting examples, the suitable peroxide compounds can be selected from hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides, and peroxyketals.

Any suitable azo compound that can initiate polymerization can be used in the invention. As non-limiting examples, the azo compounds can be selected from 4-4'-azobis(4-cyanovaleric acid), 1-1'-azobiscyclohexanecarbonitrile, 2-2'-azobisisobutyronitrile, 2-2'-azobis(2-methylpropionamidine)dihydrochloride, 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane)dihydrochloride, 2,2'-azobis(N, N'-dimethyleneisobutyramidine)dihydrochloride and 2-(carbamoylazo)-isobutyronitrile.

Figure 1:
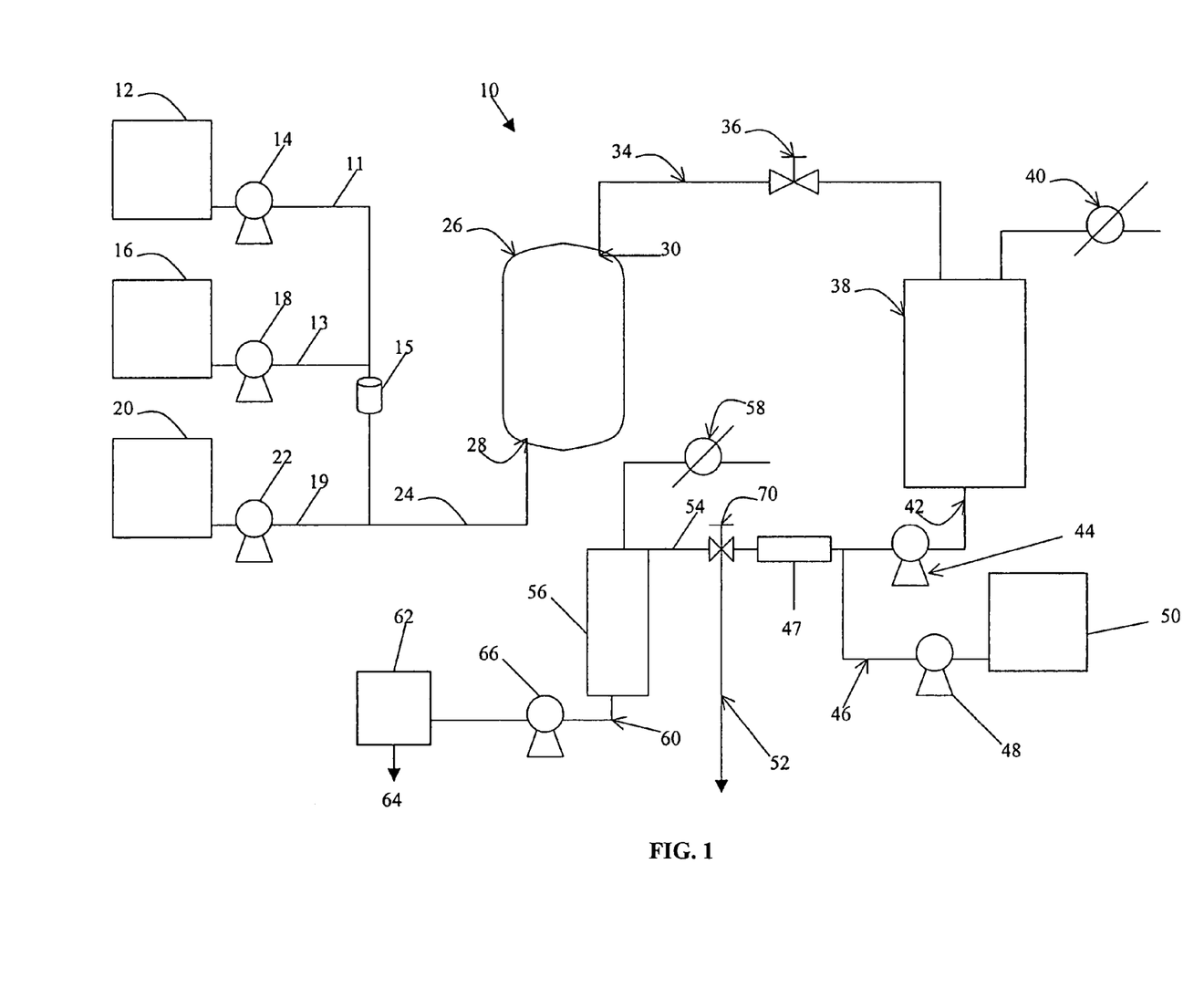
FIG. 1 is a schematic drawing depicting the method of the present invention.

An embodiment of the invention is shown in FIG. 1, which generally depicts a process for making a copolymer using equipment assembly 10 according to the present invention. In equipment assembly 10, monomer feed tanks 12 and 16, which contain monomer compositions as described above are fed via discharge pipes 11 and 13 respectively, which lead to pumps 14 and 18 respectively, which can be computer controlled. In an embodiment of the invention, one of the tanks can contain a volatile monomer, a non-limiting example being isobutylene, and be pressurized, for example, by applying nitrogen or another inert gas, so that the monomer can be fed as a liquid. The monomer streams from feed tanks 12 and 16 can be mixed, as a non-limiting example, by passing them through an in-line mixer 15. Pumps 14 and 18 can be computer controlled feed pumps.

An initiator as described above, in liquid form or in an initiator-solvent solution, is contained in feed tank 20, which has a discharge pipe 19 leading to pump 22, which can be computer controlled. Lines exiting pumps 14, 18, and 22 lead to a common feed line 24, which enters stirred tank reactor (STR) 26, at inlet 28, which is generally located in the lower portion of STR 26. As an alternative embodiment, the line from pump 22 can be separately connected to STR 26 so that no initiator-monomer mixing takes place until both have been fed to STR 26. In an embodiment of the invention, inlet 28 empties into a bottom portion, in some cases the bottom third, in other cases the bottom one tenth of the volume of STR 26. However, inlet 28 can include a pipe that extends into STR 26 to a height that provides entry of the monomers and initiators at any level in STR 26. Further, the height of the pipe in inlet 28 can be adjustable. When volatile monomers are used, pumps 14, 18, and 22 are typically high pressure pumps.

In an embodiment of the invention, the monomers from feed tanks 12 and 16 are mixed with the initiator composition from feed tank 20 prior to being fed to STR 26. Further to this embodiment, the monomer compositions and the initiator compositions can be mixed using a static mixer (not shown).

STR 26 is capable of being pressurized and typically includes a mixer with turbine (not shown), inlet 28 and outlet 30. The turbine is generally capable of providing good bottom to top and top to bottom mixing of the contents in STR 26. Depending on the nature of the reactants, the application of mixing is optional and it is applied in some reactions and not applied in other reactions. In an embodiment of the invention, STR 26 is hydraulically full during the process. Discharge line 34 exits STR 26 at outlet 10. STR 26 can be jacketed for heating and/or cooling purposes and can have internal coils for heating and/or cooling purposes.

As used herein, the term "hydraulically full" refers to those situations where 100% of the volume of the STR contains liquid and there is substantially no air or vapor space in the reactor.

The volume of STR 26 can be any volume that will provide the desired throughput and residence time in the present process. The volume of STR 26 can be at least 0.1 liters, in certain situations at least 1 liter, in some cases at least 2 liters, in other cases at least 3 liters, in some situations at least 5 liters, in other situations at least 10 liters, and in other situations at least 15 liters. Also, the volume of STR 26 can be up to 250 liters, in some cases up to 200 liters, in other cases up to 150 liters, in some situations up to 100 liters, in other situations up to 50 liters, and in particular situations up to 30 liters. The volume of STR 26 can be any of the stated values and can range between any of the values recited above.

The pressure in the process stream is controlled by back pressure valve 36 located on discharge line 34. Typically, a set pressure is maintained in order to keep all of the components in the reactor in a liquid state.

The pressure in STR 26 is typically any pressure sufficient to maintain all components in a liquid state, usually a pressure where the boiling temperature of all components is greater than the operating temperature in STR 26. The pressure in the STR can be at least 300 psi, in some case at least 350 psi, and in other cases at least 400 psi. Also, the pressure in the STR can be to up to 1,000 psi, in some cases up to 800 psi, in other cases up to 700 psi, and in some situations up to 600 psi. The pressure in STR 26 is limited by the rating for the reactor. The pressure in STR 26 can be any value or range between any set of values recited above.

The temperature in STR 26 is maintained at a temperature where the boiling temperature of all components, at the operating pressure, is greater than the operating temperature in STR 26. The temperature in STR 26 can be at least 50° C., in some cases at least 100° C., and in other cases at least 150° C. Also, the temperature in STR 26 can be up to 300° C., in some cases up to 250° C., in other cases up to 230° C., and in some situations up to 200° C. The temperature in STR 26 can vary based on the monomers being used, the desired molecular weight of the resulting copolymer, and the pressure rating of the reactor. The temperature in STR 26 can be any value or range between any set of values recited above.

As used herein, the term "residence time" refers to the average period of time that the monomers, initiators, and other reactants, in their reacted and unreacted form, are present in the STR.

The reacting monomers and final product copolymer will have a residence time in STR 26 of at least 1 minute, in some cases at least 5 minutes, in other cases at least 10 minutes, in some situations at least 15 minutes, and in other situations at least 20 minutes. Also, the residence time in STR 26 can be up to six hours, in some cases up to 5 hours, in other cases up to 4 hours, in some situations up to 3 hours, in other situations up to 2 hours, and in particular situations up to 1 hour. The residence time will vary based on the monomers used, the molecular weight desired, the conversion desired, and the temperature in STR 26. The residence time of reacting monomers and final product copolymer in STR 26 can be any value or range between any set of values recited above.

The conversion (i.e., the chemical transformation of monomers to copolymers) in STR 26 can vary based on the desired process parameters employed and the characteristics (molecular weight, copolymer composition, and the like). In many cases unreacted monomers can be removed later in the process. The conversion in STR 26 can be at least 50%, in some cases at least 55%, in other cases at least 60%, in some situations at least 65%, and in other situations at least 75% calculated as the weight percent of copolymer based on the total weight of monomers employed. Also, the conversion in STR 26 can be up to 100%, in some cases up to 99.9%, in other cases up to 99%, in some situations up to 96%, in other situations up to 95%, and in particular situations up to 90% calculated as the weight percent of copolymer based on the total weight of monomers employed. The conversion in STR 26 can be any value or range between any set of values recited above.

In an embodiment of the invention, after discharging the copolymer composition from STR 26, the copolymer composition is optionally fed to a second STR (not shown). The second STR, when used, increases the overall residence time of the reactants to provide a higher conversion of monomers to copolymer. The conversion in the second STR can be up to 100%, in some cases up to 99.9%, in other cases up to 99%, in some situations up to 96%, in other situations up to 95%, and in particular situations up to 90% calculated as the weight percent of copolymer based on the total weight of monomers initially employed.

In an embodiment of the invention, after discharging the copolymer composition from the second STR, the copolymer composition is optionally fed to a third STR (not shown). The third STR, when used, increases the overall residence time of the reactants to provide a higher conversion of monomers to copolymer. The conversion in the third STR can be up to 100%, in some cases up to 99.9%, in other cases up to 99%, in some situations up to 96%, in other situations up to 95%, and in particular situations up to 90% calculated as the weight percent of copolymer based on the total weight of monomers initially employed.

From STR 26, a reaction mixture that includes the inventive copolymer composition, optionally unreacted monomers and other by-products from the polymerization reaction is continuously discharged and transferred to flash tank 38. When a second STR or when a second STR and a third STR are used, the copolymer composition is continuously discharged from the second STR or the third STR, respectively, to flash tank 38. Flash tank 38 is maintained at a temperature of from at least 140° C., in some cases at least 150° C., and in other cases at least 160° C. Also, flash tank 38 is maintained at a temperature of up to 250° C., in some cases up to 230° C., in other cases up to 210° C., in some situations up to 200° C., in other situations up to 190° C., and in particular situations up to 180° C. The temperature in flash tank 38 is determined based on the composition of the reaction mixture being transferred thererto. The temperature in flash tank 38 can be any value or range between any set of values recited above The vacuum maintained in flash tank 38 is determined based on the composition of the reaction mixture and the temperature in flash tank 38. The vacuum in flash tank 38 can be at least 30, in some cases at least 50 and in other cases at least 100 mm Hg. Also, the vacuum maintained in flash tank 38 can be up to 300, in some cases up to 250, and in other cases up to 200 mm Hg. The vacuum in flash tank 38 can be any value or range between any set of values recited above. The vacuum on flash tank 38 is maintained by vacuum apparatus 40 (which can be a vacuum distillation apparatus).

The volume of flash tank 38 typically depends on the volume of STR 26. The volume of flash tank 38 can be greater than the volume of STR 26, in some cases at least twice the volume of STR 26, in other cases at least three times the volume of STR 26, and in some situations at least four times the volume of STR 26. Also, the volume of flash tank 38 can be up to 10 times the volume of STR 26, in some cases up to 8 times the volume of STR 26, and in other cases at least 7 times the volume of STR 26. The volume of flash tank 38 can be any value or range between any set of values recited above.

Once the reaction mixture enters flash tank 38, the volatile components evaporate to form a vapor phase. In a particular embodiment, the unreacted monomer, as a non-limiting example the monomers of structure (I), are substantially recovered from the copolymer composition by applying a vacuum to flash tank 38. Monomers and other volatile materials are recovered using vacuum distillation equipment known in the art as indicated by vacuum distillation unit 40.

In an embodiment of the invention, the recovered unreacted monomer of structure (I) is used to constitute a portion of the monomer composition in (b) or a monomer in the monomer of feed tanks 12 and/or 16.

The copolymer composition is continuously removed from flash tank 38, via discharge line 42 using gear pump 44, which also provides a vacuum seal. Thus, the copolymer composition is discharged from flash tank 38. In an embodiment of the invention, the liquid level in and the discharge rate from flash tank 38 is controlled using a differential pressure (DP) cell, which measures the height of the liquid in flash tank 38.

In an embodiment of the invention, after discharging the copolymer composition from flash tank 38, the copolymer composition is mixed with a solvent. In this embodiment, a solvent in solvent tank 50 is transferred to transfer pipe 46 via pump 48, just before in-line mixer 47. The copolymer composition is transferred using pump 44 and is mixed with solvent in in-line mixer 47 after which the final product solution and/or dispersion of the present copolymer composition in a solvent exits the process 52 for packaging and/or other processing.

In another embodiment of the invention, the copolymer composition is transferred from flash tank 38 to wiped film evaporator (WFE) 56 via pump 44 and transfer pipe 54, by appropriately directing valve 70. Vacuum distillation apparatus 58 is in fluid contact with WFE 56 and maintains a vacuum in WFE 56 and removes volatile liquids from the copolymer composition, discharging them from the process as a liquid. The vacuum in WFE 56 is at least 2, in some cases at least 25, and in other cases at least 50 mm Hg. Also, the vacuum in WFE 56 can be up to 500, in some cases up to 200, and in other cases up to 100 mm Hg. The vacuum in WFE 56 can be any value or range between any set of values recited above. The vacuum on WFE 56 is maintained by vacuum apparatus 58 (which can be a vacuum distillation apparatus).

The temperature in WFE 56 is at least 120° C., in some cases at least 140° C., and in other cases at least 170° C. Also, the temperature in WFE 56 can be up to 250° C., in some cases up to 200° C., and in other cases up to 190° C. The temperature in WFE 56 can be any value or range between any set of values recited above.

The polymer composition is transferred from WFE 56 via pump 66 and transfer pipe 60 to flaker 62, from which the polymer composition is discharged 64 from the process as a dry, flaked material, which can be packaged or further processed.

Thus, embodiments of the present invention provide a method, operated as a continuous process, where the monomers and initiators are introduced to STR 26 at essentially the same rate as the copolymer or copolymer composition is withdrawn from STR 26 and any unreacted monomers of structure (I) are removed from the copolymer or copolymer composition and used as part of at least one of the monomers compositions in (b).

In an embodiment of the invention, the individual items of equipment, piping, pumps, etc., can be made from any suitable material. Suitable materials are those that will not fail, corrode, and/or unnecessarily wear when exposed to the above-recited compositions and processing conditions. As non-limiting examples, the individual items of equipment, piping, pumps, etc., can be made from Hastelloy, Monel, aluminum, carbon, ceramics, chrome, K-Monel, M-50, plastics, 302 Stainless, 304 Stainless, 316 Stainless, 316L Stainless, 420 Stainless, 440 Stainless, tungsten carbide, and combinations thereof as are readily known in the art.

In an embodiment of the invention, monomers according to structure (I) are included at a level of 50 mole %, in some cases greater than 50 mole %, based on the total number of moles of monomers in the monomer compositions in (b). Also, the amount of monomers according to structure (I) do not exceed 60, in some cases do not exceed 55, in other cases do not exceed 54, in some situations do not exceed 53, in other situations do not exceed 52, in particular situations do not exceed 51 and in selected situations do not exceed 50.5 mole % of the monomers in the monomer compositions of (b). The amount of monomers according to structure (I) can be included at any indicated level or can range between any values recited above.

In a particular embodiment, the monomer of structure (I) is present at a molar excess over the other monomers in the monomer compositions in (b). As used herein, the term "molar excess" refers to the amount of a monomer included in a monomer composition over and above the amount that is desired in the resulting copolymer. As a non-limiting example, if monomer A is desired at 25 mole % of a copolymer and is included in a monomer composition at 30 mole %, then it is present at a molar excess of 5 mole %. In this embodiment, the monomer of structure (I) is present at a molar excess over the other monomers in the monomer compositions in (b) of up to 10 mole %, in some cases up to 5 mole %, in other cases up to 3 mole %, in some situations up to 2 mole %, in other situations up to 1 mole %, and in particular situations up to 0.5 mole %. The monomer of structure. (I) can be present at a molar excess over the other monomers in the monomer compositions in (b) at any molar excess indicated above and can range between any of the values recited above.

While not being limited to any one theory, it is believed that the amount of excess required of monomers according to structure (I) is substantially less using the inventive process because the one or more STRs are maintained hydraulically full. In this manner, there is substantially no vapor space, where volatile monomers according to structure (I) can reside, preventing their participation in the polymerization reaction. Further, the hydraulically full STR provides for better and more intimate mixing of components, encouraging efficiency and higher conversion.

In an embodiment of the invention, one or more of the monomer compositions in (b) includes other ethylenically unsaturated monomers of general structure (IV):

(IV)

where $R^{11}$, $R^{12}$, and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$-$C_8$ cycloalkyl, heterocyclyl and phenyl; $R^{13}$ is selected from the group consisting of H, $C_1$-$C_6$ alkyl, $COOR^{15}$, wherein $R^{15}$ is selected from the group consisting of H, an alkali metal, a $C_1$ to $C_6$ alkyl group, glycidyl and aryl, which can optionally include one or more functional groups. In a particular embodiment, the other ethylenically unsaturated monomers are one or more selected from the group consisting of acrylic, methacrylic monomers, and allylic monomers.

In a particular embodiment of the invention, one or more monomer compositions is fed to STR 26 by way of at least one of the inlets, and the monomer compositions include (i) a donor monomer composition that includes one or more monomers according to structure (I) and (ii) a monomer composition that includes one or more ethylenically unsaturated acceptor monomers. As such, the monomers are converted to alternating copolymers by way of the process steps described above. Further to this embodiment, the monomers of structure (I) can have a group $R^2$, which includes one or more functional groups selected from epoxy, carboxylic acid, hydroxy, amide, oxazoline, acetoacetate, isocyanate, carbamate, amine, amine salt, quaternized amine, thiol, methylol, methylol ether, and sulfonium salt, and can include monomers selected from isobutylene, diisobutylene, dipentene, isoprenol, and mixtures thereof. Additionally to this embodiment, at least one monomer composition in (b) includes one or more acceptor monomers selected from acrylonitrile and acrylic monomers described by structure (III), where Y can optionally include at least one functional group of one or more selected from the group consisting of epoxy, carboxylic acid, hydroxy, amide, oxazoline, acetoacetate, isocyanate, carbamate, amine, amine salt, quaternized amine, thiol, methylol, methylol ether, and sulfonium salt.

In an additional embodiment, at least one monomer composition in (b) can be one or more monomers selected from styrene, substituted styrenes, methyl styrene, substituted methyl styrenes, vinyl ethers, and vinyl pyridine.

In an embodiment of the invention, the process includes further reacting the resulting copolymer composition, after the polymerization process is substantially complete, such that one or more functional groups are incorporated into the copolymer. In a particular embodiment, the functional groups incorporated into the copolymer are one or more selected from epoxy, carboxylic acid, hydroxy, amide, oxazoline, acetoacetate, isocyanate, carbamate, amine, amine salt, quaternized amine, thiol, methylol, methylol ether, and sulfonium salt.

The present invention is also directed to copolymers prepared by the inventive method. Such copolymers can be described as having residues from monomers according to structure (I) that alternate along the polymer chain with residues from acceptor monomers. In an embodiment of the invention, the acceptor monomers can be one or more monomers according to structure (III). When other monomers are used in the present process, portions of the polymer chain can include randomly incorporated residues from the monomers that are used in the process. Embodiments of the invention provide that the segments containing alternating residues from monomers according to structure (I) and acceptor monomers make up a least 30 weight percent, in some cases at least 40 weight percent, and in other cases at least 50 weight percent of the resulting copolymer. Also, the segments containing alternating residues from monomers according to structure (I) and acceptor monomers can make up 100 weight percent, in some cases up to 95 weight percent, in other cases up to 90 weight percent, in some situations up to 80 weight percent, in other situations up to 75 weight percent, and in particular situations up to 70 weight percent of the resulting copolymer. The segments containing alternating residues from monomers according to structure (I) and acceptor monomers can make up any portion of the copolymer as indicated above and can range between any two values as recited above.

In an embodiment of the invention, the copolymer composition that results from the present method is substantially free of transition metals and Lewis acids which, as noted above, have been used in the prior art to make alternating copolymers of moderate donor monomers and moderate acceptor monomers. The present invention does not utilize transition metals or Lewis acid adjuncts in preparing the present copolymer composition; therefore, they need not be removed after polymerization, and the resulting copolymer compositions will not suffer the drawbacks inherent in those that contain transition metals or Lewis acids.

In another embodiment of the invention, the resulting copolymer has a molecular weight of at least 250, in many cases at least 500, typically at least 1,000, and in some cases at least 2,000. The present copolymer may have a molecular weight of up to 1,000,000, in many cases up to 500,000, typically up to 100,000, and in some cases up to 50,000. Certain applications will require that the molecular weight of the present copolymer not exceed 25,000, in some cases not exceed 20,000, and in certain instances not exceed 16,000. The molecular weight of the copolymer is selected based on the properties that are to be incorporated into the copolymer composition. The molecular weight of the copolymer may vary in any range of values inclusive of those stated above.

In a particular embodiment of the invention, the polydispersity index (PDI) of the copolymer produced using the present method is typically less than 4, in many cases less than 3.5, typically less than 3.0, and in some cases less than 2.5. As used herein and in the claims, "polydispersity index" is determined from the following equation: (weight average molecular weight ($M_w$)/number average molecular weight ($M_n$)). A monodisperse polymer has a PDI of 1.0. Further, as used herein, $M_n$ and $M_w$ are determined from gel permeation chromatography using polystyrene standards.

The copolymer that results from the present method may be utilized as a starting material for the preparation of other polymers by using functional group transformations by methods known in the art. Functional groups that can be introduced by these methods are epoxy, carboxylic acid, hydroxy, amide, oxazoline, acetoacetate, isocyanate, carbamate, amine, amine salt, quaternized amine, thiol, methylol, methylol ether, and sulfonium salt.

For example, a copolymer of the present method comprising methyl acrylate will contain carbomethoxy groups. The carbomethoxy groups can be hydrolyzed to carboxyl groups or transesterified with an alcohol to form the corresponding ester of the alcohol. Using ammonia, the aforementioned methyl acrylate copolymer can be converted to an amide or, using a primary or secondary amine, can be converted to the corresponding N-substituted amide. Similarly, using a diamine such as ethylene diamine, one can convert the aforementioned copolymer of the present method to an N-aminoethylamide or, with ethanolamine, to an N-hydroxyethylamide. The N-aminoethylamide functionality can be further converted to an oxazoline by dehydration. The N-aminoethylamide can be further reacted with a carbonate such as propylene carbonate to produce the corresponding urethane functional copolymer. These transformations can be carried out to convert all of the carbomethoxy groups or can be carried out in part, leaving some of the carbomethoxy groups intact.

Epoxy groups can be introduced into the copolymer of the present method directly by using glycidyl acrylate in the copolymer preparation or indirectly by functional group transformation. One example of an indirect method is to oxidize residual unsaturation in the copolymer to epoxy groups using a peracid such as peroxyacetic acid. Alternatively one can prepare a carboxyl-functional copolymer by hydrolysis as described above, treat the carboxyl-functional copolymer with epichlorohydrin then alkali to produce the epoxy-functional copolymer. These transformations can also be carried out exhaustively or in part. The resulting epoxy-functional copolymer can be further reacted with the appropriate active hydrogen containing reagents to form alcohols, amines, or sulfides.

Hydroxyl groups can be introduced directly using a hydroxyl-functional monomer such as hydroxyethyl acrylate in the copolymer of the present method, or they can be introduced by functional group transformation. By treating the carboxyl-functional copolymer described above with an epoxy one can produce a hydroxyl-functional polymer. Suitable epoxies include, but are not limited to, ethylene oxide, propylene oxide, butylene oxide and glycidyl neodecanoate.

The above-described hydroxyl-functional copolymers can be further reacted to form other copolymers. For example, a copolymer containing hydroxyethyl groups can be treated with a carbamylating agent, such as methyl carbamate, to produce the corresponding carbamate-functional copolymer. With diketene or t-butyl acetoacetate the hydroxyl groups can also be converted to acetoacetate esters.

Isocyanate-functional copolymers can also be produced. Copolymers of the present method, which contain 2 or more hydroxyl groups, can be treated with a diisocyanate such as isophoronediisocyanate to produce isocyanate-functional polymers. Primary amine-functional copolymers, described above, can be phosgenated to produce isocyanate functionality.

Ionic functionality can be incorporated into the copolymer of the present method by any means known in the art. Carboxylate groups can be introduced by hydrolysis of ester groups in the copolymer followed by reaction with base. Amine salts can be introduced by preparing the present copolymer with an amine functional acrylate, such as dimethylaminoethyl acrylate, followed by protonation of the amino groups with an acid. Amine salts can also be introduced by reacting a glycidyl functional copolymer with ammonia or an active hydrogen-containing amine followed by protonation with acid. Quaternary amine functional groups or ternary sulfonium groups can be introduced into the copolymer by treating an epoxy-functional copolymer of the present method with a tertiary amine or sulfide, respectively, in the presence of a protic acid.

The present invention is more particularly described in the following examples, which are intended to be illustrative only, since numerous modifications and variations therein will be apparent to those skilled in the art. Unless otherwise specified, all parts and percentages are by weight.

EXAMPLES 1-4

The following examples demonstrate the preparation of a 25/20/55 w/w/w copolymer of isobutylene/hydroxypropyl acrylate/butyl acrylate using the method of the present invention.

Feed tanks 2 and 3 were agitated vessels on load cells equipped with a nitrogen purge system for the atmosphere above the liquid. The liquids were pumped from these tanks to the reactor vessel via a Pulsafeeder® Diaphragm Pump (Pulsafeeder Inc., Rochester, N.Y.) capable of 800 psi output pressure. The rate of feed was controlled by changing the stroke frequency of the pump in response to the loss of weight signal from the load cell on the tank.

Feed Tank 1 was an LPG type cylinder. Pressure was maintained at 70 psi using. $N_2$. Liquid was pumped from the bottom of the vessel by a Pulsafeeder® Diaphragm Pump. The tank was on load cells and the rate was controlled by changing the pump stroke frequency in response to a loss in weight signal from the load cells.

The reactor was a 5-gallon stainless steel pressure vessel (Pressure Products Industries, Inc., Warminster, Pa.) equipped with a full jacket and an internal coil. The vessel had a pressure rating of 2000 psi and was equipped with a magnetic drive agitator with two turbine agitator blades. The jacket was heated/cooled using a circulating pressurized water system. The internal coil was used for cooling with well water or heating with steam. The feeds entered the bottom of the reactor and exited at the top. The reactor was maintained hydraulically full by keeping back pressure on it using a back pressure control valve (Nupro Valve, Swagelok Company, Solon, Ohio) to set the internal pressure higher than the boiling point of the contents. Pressure was supplied by the vapor pressure of the components and the feed pumps.

The flash tank was a stainless steel vessel capable of full vacuum and 50 psi pressure. It was jacketed and had steam/water available for heating/cooling. It was equipped with an agitator and system capable of pulling full vacuum through a condenser. A differential pressure cell was used to monitor liquid level. Polymer was pumped from this vessel using a Viking Jacket Gear Pump (Viking Pump, Inc., Cedar Falls, Iowa) designed to handle molten polymers. This pump also maintained the vacuum seal on the vessel and transferred material to the wiped film evaporator.

The wiped film evaporator, LUWA Filmtruder (5.4 square ft.) made by LCI Corp., Charlotte, N.C., was used to further devolatilize resins when necessary. The wiped film evaporator had a full jacket heated by steam and was capable of full vacuum. Residuals were pulled through a condenser system via vacuum pump. The product exited the bottom of the evaporator through a MAAG® Pump (Maag Pump Systems Textron Inc., Charlotte, N.C.) designed to handle high viscosity polymer melts, which provided the vacuum seal for the unit. The polymer was pumped to a chilled belt flaker for cooling and solidification.

The contents of the feed tanks were prepared containing materials as described in the following table.

|  | Example 1 | Example 2 | Example 3 | Example 4 |
|---|---|---|---|---|
| Feed Tank 1 |  |  |  |  |
| Isobutylene |  |  |  |  |
| Pressure in tank (psi) | 70 | 70 | 70 | 70 |
| Feed rate to reactor (lb./min) | 0.39 | 0.524 | 0.59 | 0.59 |
| Feed Tank 2 |  |  |  |  |
| Hydroxypropyl acrylate (lb./min) | 0.314 | 0.418 | 0.472 | 0.474 |
| Butyl acrylate (lb./min) | 0.865 | 1.152 | 1.298 | 1.298 |
| Feed rate to reactor (lb./min) | 1.189 | 1.57 | 1.77 | 1.77 |
| Feed Tank 3 |  |  |  |  |
| di-t-amyl peroxide |  |  |  |  |
| Feed rate to reactor (lb./min) | 0.063 | 0.084 | 0.094 | 0.071 |
| Conditions in Reactor |  |  |  |  |
| Residence time (min) | 25 | 18 | 16 | 16.2 |
| Temperature (° C.) | 200 | 205 | 210 | 200 |
| Pressure (psi) | 500 | 500 | 500 | 500 |
| Conversion (wt. %) | 93 | 93 | 93 | 93 |
| Molecular Weight |  |  |  |  |
| $M_w$ | 3004 | 3133 | 2781 | 3441 |
| $M_n$ | 1517 | 1593 | 1446 | 1699 |
| $M_w/M_n$ | 1.98 | 1.97 | 1.92 | 2.02 |
| $M_z$ | 5332 | 5588 | 5004 | 6151 |

The compositions in feed tanks 1, 2, and 3 fed at the indicated rates and commingled in a feed line just prior to addition to the 5-gallon stirred tank reactor (STR) pressurized to 500 psi with pulse feeder pumps and equipped with a thermocouple. The reactor was maintained at the indicated temperature and pressure, and once the STR was hydraulically full, the compositions from feed tanks 1, 2, and 3 had the indicated residence time in the STR based on the flow rate exiting the STR.

The reaction mixture from the STR was fed to a flash tank, which had a volume of 10 gallons and was maintained at a pressure of 150 mm Hg and a temperature of 345° C. The liquid recovered from a vacuum distillation apparatus connected to the flash tank contained no detectable isobutylene. The polymer composition recovered from the flash tank contained 100 wt. % resin solids. The resulting copolymer had a composition of 21 wt. % isobutylene, 27 wt. % hydroxypropyl acrylate, and 52 wt. % butyl acrylate by NMR analysis. Molecular weight was determined by gel permeation chromatography (GPC) using polystyrene standards.

EXAMPLES 5 AND 6

The following examples demonstrate the preparation of copolymers of isobutylene/methyl acrylate/acrylic acid and isobutylene/t-butyl acrylate using the method of the present invention. The process was run at lab scale using a 600 cc reactor equipped as described in the previous examples. The contents of the feed tanks were prepared containing materials as described in the following table.

|  | Example 5 | Example 6 |
|---|---|---|
| Feed Tank 1 | | |
| Isobutylene | | |
| Pressure in tank (psi) | 70 | 70 |
| Feed rate to reactor (g/min) | 7.9 | 6.2 |
| Feed Tank 2 | | |
| Methyl acrylate (g/min) | 10 | |
| Acrylic acid (g/min) | 6.4 | |
| t-Butyl acrylate (g/min) | | 17.8 |
| Feed Tank 3 | | |
| di-t-amyl peroxide (g/min) | 0.9 | 0.96 |
| Methyl isobutyl ketone (g/min) | 1.5 | |
| Conditions in Reactor | | |
| Residence time (min) | 25 | 25 |
| Temperature (° C.) | 185 | 175 |
| Pressure (psi) | 500 | 500 |
| Conversion (wt. %) | 90 | 91.5 |
| Molecular Weight | | |
| $M_w$ | 5076 | 4225 |
| $M_n$ | 1916 | 2034 |
| $M_w/M_n$ | 2.65 | 2.08 |
| $M_z$ | 9893 | 6746 |

For Example 6, the resulting copolymer had a composition of 41 mole % isobutylene and 59 mole % t-butyl acrylate by NMR analysis. Molecular weight was determined by GPC using polystyrene standards.

The present invention has been described with reference to specific details of particular embodiments thereof. It is not intended that such details be regarded as limitations upon the scope of the invention except insofar as and to the extent that they are included in the accompanying claims.

We claim:

1. A continuous process for making a copolymer composition containing residues of at least one olefinic monomer comprising the steps of:
   (a) providing at least one pressurized stirred tank reactor (STR) having at least one inlet and at least one outlet;
   (b) feeding one or more monomer compositions to an STR by way of at least one of the inlets, wherein at least one monomer composition comprises one or more monomers having the following structure (I):

wherein $R^1$ is linear or branched $C_1$ to $C_4$ alkyl and $R^2$ is selected from the group consisting of methyl, linear, cyclic or branched $C_1$ to $C_{20}$ alkyl, alkenyl, aryl, alkaryl and aralkyl, any of which can optionally include one or more functional groups;
   (c) feeding one or more initiator compositions to the STR by way of one or more of the inlets;
   (d) maintaining the STR hydrolytically full such that there is substantially no air or vapor space in the reactor;
   (e) maintaining the monomer compositions in (b) and the initiator compositions in (c) in the STR for a residence time sufficient to effect conversion of the monomers to a copolymer composition; and
   (f) discharging the copolymer composition by way of the outlet;

wherein the monomers and initiators are introduced to the STR at essentially the same rate as the copolymer is withdrawn from the STR and any unreacted monomers of structure (I) are removed from the copolymer and used as part of at least one of the monomers compositions in (b).

2. The method of claim 1, wherein at least one monomer composition in (b) comprises one or more monomers selected from the group consisting of styrene, substituted styrenes, methyl styrene, substituted methyl styrenes, vinyl ethers and vinyl pyridine.

3. The method of claim 1, wherein at least one monomer composition in (b) comprises one or more monomers selected from the group consisting of acrylonitrile and acrylic monomers described by structure (III):

wherein Y is selected from the group consisting of —$NR^3_2$, —O—$R^5$—O—C(=O)—$NR^3_2$, and —$OR^4$; $R^3$ is selected from the group consisting of H, linear or branched $C_1$ to $C_{20}$ alkyl and linear or branched $C_1$ to $C_{20}$ alkylol; $R^4$ is selected from the group consisting of H, poly(ethylene oxide), poly(propylene oxide), linear or branched $C_1$ to $C_{20}$ alkyl, alkylol, aryl, alkaryl and aralkyl, linear or branched $C_1$ to $C_{20}$ fluoroalkyl, fluoroaryl and fluoroaralkyl, a siloxane, a polysiloxane, an alkyl siloxane, an ethoxylated trimethylsilyl siloxane and a propoxylated trimethylsilyl siloxane; $R^5$ is a divalent linear or branched $C_1$ to $C_{20}$ alkyl linking group; and $R^3$ and/or $R^4$ optionally include one or more functional groups.

4. The method of claim 1, wherein the monomer of structure (I) is selected from the group consisting of isobutylene, diisobutylene, dipentene,. isoprenol, and mixtures thereof.

5. The method of claim 1, wherein the group $R^2$ of the monomer of structure (I) includes one or more functional groups selected from the group consisting of epoxy, carboxylic acid, hydroxy, amide, oxazoline, acetoacetate, isocyanate, carbamate, amine, amine salt, quaternized amine, thiol, methylol, methylol ether, and sulfonium salt.

6. The method of claim 4, wherein Y includes at least one functional group of one or more selected from the group consisting of epoxy, carboxylic acid, hydroxy, amide, oxazoline, acetoacetate, isocyanate, carbamate, amine, amine salt, quaternized amine, thiol, methylol, methylol ether, and sulfonium salt.

7. The method of claim 1, wherein the resulting copolymer composition is reacted such that one or more functional groups are incorporated into the copolymer.

8. The method of claim 7, wherein the functional groups incorporated into the copolymer are one or more selected from the group consisting of epoxy, carboxylic acid, hydroxy, amide, oxazoline, acetoacetate, isocyanate, carbamate, amine, amine salt, quaternized amine, thiol, methylol, methylol ether, and sulfonium salt.

9. The method of claim 1, wherein the initiator composition comprises a thermal free radical initiator.

10. The method of claim 9, wherein the thermal free radical initiator is selected from the group consisting of a peroxide compound, an azo compound, a persulfate compound, and mixtures thereof.

11. The method of claim 10, wherein the peroxide compound is one or more selected from the group consisting of hydrogen peroxide, methyl ethyl ketone peroxides, benzoyl peroxides, di-t-butyl peroxides, di-t-amyl peroxides, dicumyl peroxides, diacyl peroxides, decanoyl peroxide, lauroyl peroxide, peroxydicarbonates, peroxyesters, dialkyl peroxides, hydroperoxides, and peroxyketals.

12. The method of claim 10, wherein the azo compound is one or more selected from the group consisting of 4-4'-azobis(4-cyanovaleric acid), 1-1'-azobiscyclohexanecarbonitrile, 2-2'-azobisisobutyronitrile, 2-2'-azobis(2-methylpropionamidine)dihydrochloride, 2-2'-azobis(2-methylbutyronitrile), 2-2'-azobis(propionitrile), 2-2'-azobis(2,4-dimethylvaleronitrile), 2-2'-azobis(valeronitrile), 2,2'-azobis[2-methyl-N-(2-hydroxyethyl)propionamide], 4,4'-azobis(4-cyanopentanoic acid), 2,2'-azobis(N,N'-dimethyleneisobutyramidine), 2,2'-azobis(2-amidinopropane)dihydrochloride, 2,2'-azobis(N,N'-dimethyleneisobutyramidine)dihydrochloride, and 2-(carbamoylazo)-isobutyronitrile.

13. The method of claim 1, wherein any of the monomer compositions contain one or more of the monomers selected from the group consisting of hydroxyethyl acrylate, hydroxypropyl acrylate, acrylic acid, methyl acrylate, ethyl acrylate, butyl acrylate, isobutyl acrylate, isobornyl acrylate, dimethylaminoethyl acrylate, acrylamide, chlorotrifluoroethylene, glycidyl acrylate, 2-ethylhexyl acrylate and n-butoxy methyl acrylamide.

14. The method of claim 1, wherein after discharging the copolymer composition in (f), the copolymer composition is fed to a flash tank.

15. The method of claim 14, wherein unreacted monomer of structure (I) is substantially recovered from the resulting copolymer composition by applying a vacuum to the flash tank.

16. The method of claim 14, wherein the copolymer composition is discharged from the flash tank.

17. The method of claim 1, wherein after discharging the copolymer composition in (f), the copolymer composition is mixed with a solvent.

18. The method of claim 15, wherein the recovered unreacted monomer of structure (I) comprises a portion of the monomer composition in (b).

19. The method of claim 1, wherein the residence time in the STR in (e) is from 5 minutes to six hours.

20. The method of claim 1, wherein the residence time in the STR in (e) is a period of time sufficient to incorporate at least 75 mole % of the monomers of structure (I) into the copolymer composition.

21. The method of claim 1, wherein mixing is applied by the STR in (e).

22. The method of claim 1, wherein no mixing is applied in (e).

23. The method of claim 1, wherein a back pressure control valve is positioned on the outlet.

24. The method of claim 1, wherein the pressure in the STR is maintained at a pressure above the vapor pressure of any monomer in any of the monomer compositions in (b).

25. The method of claim 1, wherein the pressure in the STR is from 300 to 1,000 psi.

26. The method of claim 1, wherein the monomer compositions in (b) and the initiator compositions in (c) are fed to the STR by way of high pressure pumps.

27. The method of claim 1, wherein the monomer compositions in (b) and the initiator compositions in (c) are mixed prior to being fed to the STR.

28. The method of claim 1, wherein the inlets empty into a bottom portion of the STR.

29. The method of claim 27, wherein the monomer compositions in (b) and the initiator compositions in (c) are mixed using a static mixer.

30. The method of claim 1, wherein the temperature in the reactor is maintained at a temperature of from 50° C. to 300° C.

31. The method of claim 1, wherein after discharging the copolymer composition in (f), the copolymer composition is fed to a second STR.

32. The method of claim 31, wherein the copolymer composition is fed from the second STR to a third STR and discharged therefrom.

33. The method of claim 31, wherein the copolymer composition is discharged from the second STR to a flash tank.

34. The method of claim 32, wherein the copolymer composition is discharged from the third STR to a flash tank.

35. The method of claim 1, wherein after discharging the copolymer composition in (f), the copolymer composition is fed to a wipe film evaporator.

36. The method of claim 35, wherein the copolymer composition is discharged from the wipe film evaporator to a flaker to provide the copolymer composition in dry form.

37. The method of claim 1, wherein the monomer compositions in (b) comprise greater than 50 mole %, based on the total number of moles of monomer in the monomer compositions of the monomers of structure (I).

38. The method of claim 37, wherein the amount of the monomers in structure (I) do not exceed 55 mole %.

39. The method of claim 1, wherein one or more of the monomer compositions in (b) include one or more residues derived from other ethylenically unsaturated monomers of general structure (IV):

wherein $R^{11}$, $R^{12}$ and $R^{14}$ are independently selected from the group consisting of H, $CF_3$, straight or branched alkyl of 1 to 20 carbon atoms, aryl, unsaturated straight or branched alkenyl or alkynyl of 2 to 10 carbon atoms, unsaturated straight or branched alkenyl of 2 to 6 carbon atoms substituted with a halogen, $C_3$-$C_8$ cycloalkyl, heterocyclyl and phenyl; $R^{13}$ is selected from the group consisting of H, $C_1$-$C_6$ alkyl, $COOR^{15}$ wherein $R^{15}$ is selected from the group consisting of H, an alkali metal, a $C_1$ to $C_6$ alkyl group, glycidyl and aryl, which can optionally include one or more functional groups.

40. The method of claim 39, wherein the other ethylenically unsaturated monomers are one or more selected from the group consisting of methacrylic monomers and allylic monomers.

* * * * *

UNITED STATES PATENT AND TRADEMARK OFFICE
CERTIFICATE OF CORRECTION

PATENT NO. : 7,323,529 B2 Page 1 of 1
APPLICATION NO. : 10/723488
DATED : January 29, 2008
INVENTOR(S) : Robert A. Sutton et al.

It is certified that error appears in the above-identified patent and that said Letters Patent is hereby corrected as shown below:

Title Page; item (73);
Change the first word of the name of the Assignee from "PP6" to --PPG--.

Signed and Sealed this

First Day of July, 2008

JON W. DUDAS
*Director of the United States Patent and Trademark Office*